Feb. 25, 1930.  E. J. McKNIGHT  1,748,556
BORING MACHINE
Filed Sept. 12, 1927  3 Sheets-Sheet 1

Inventor,
Elliott John McKnight

Feb. 25, 1930.  E. J. McKNIGHT  1,748,556

BORING MACHINE

Filed Sept. 12, 1927   3 Sheets-Sheet 2

Inventor,
Elliott John McKnight
by
Atty

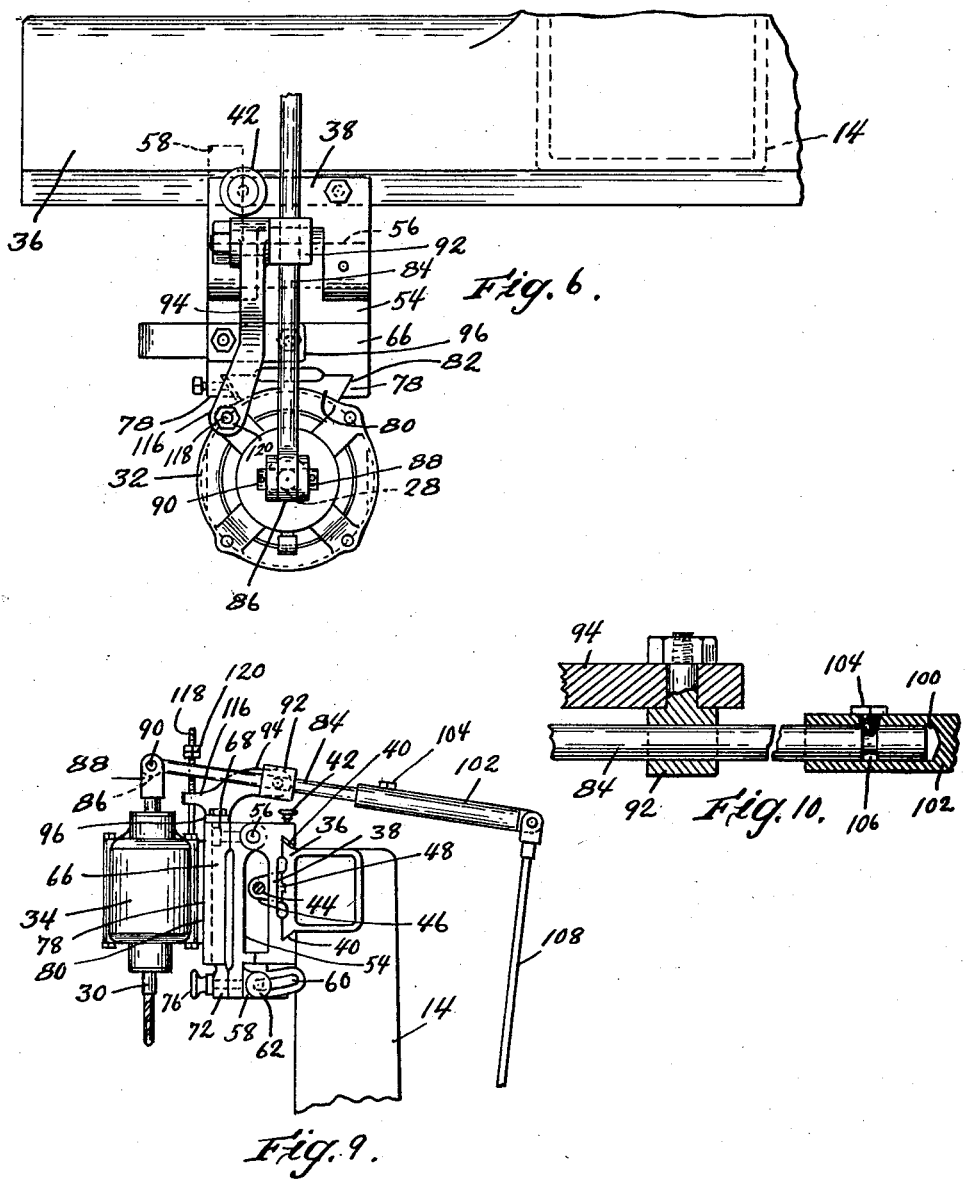

Patented Feb. 25, 1930

1,748,556

UNITED STATES PATENT OFFICE

ELLIOTT JOHN McKNIGHT, OF GARDNER, MASSACHUSETTS

BORING MACHINE

Application filed September 12, 1927. Serial No. 218,951.

This invention relates to wood-working machines and has particular reference to boring machines adapted to bore holes at various angles.

A common type of angle-boring machine has a vertical spindle in which the bit is received, with means for reciprocating the spindle in a vertical plane to sink the bit into the work, and, sometimes, means for setting the spindle to occupy various angular positions in one vertical plane, as for tilting the spindle to the right and to the left of the normal vertical axis of the spindle, to obtain angle-boring in one plane. A work-supporting table is provided which can be adjusted to hold the work at various angles with respect to the bit to obtain angle-boring in another plane. An angularly-adjustable table type of machine, however, cannot be depended upon to do accurate work as the table yields and gives under pressure of the bit, or weight of the work, and so alters the angle at which it is set.

An object of this invention is the provision of an angle-boring machine having means by which the reciprocable bit-spindle can be adjusted to occupy various angularly-related positions simultaneously in two angularly-related planes, as angular adjustment to the right and left, and also forward and back, and thereby is provided with a universal angular adjustment, whereby a solid, or non-tilting work-supporting table may be used, and duplicate work of an improved and more accurate and uniform nature turned out.

A further object of the invention is the provision of an angle-boring machine wherein the bit-spindle comprises the spindle of an electric motor which drives the bit, with means for adjusting the entire motor to occupy various angular positions in two angularly-related vertical planes, and means to reciprocate the motor in any angular position it may occupy, thereby to provide for the desired angular settings of the bit. This arrangement entirely eliminates the necessity of gearing, universal joints or sliding connections and the like between the driving element and the spindle and provides for a high degree of accuracy of work and for a long useful life of the mechanism.

A yet further object of the invention is the provision of means to permit the motor to be moved in a horizontal plane over the work-supporting table, with means for angularly-adjusting the motor in any horizontally-adjusted position it may occupy, and means for reciprocating it in any set position, whereby holes may be bored in any desired location, and at any desired angle, in the work.

A further object of the invention is generally to improve the construction and operation of boring machines.

Fig. 6 is a plan view of one of the motor units and its associated supporting elements.

Fig. 8 is a vertical sectional elevation through the work-supporting table.

Fig. 9 is a side elevation of one of the motor units and its supporting elements.

Fig. 10 is a sectional detail of the lever for reciprocating the motor.

Figure 1:
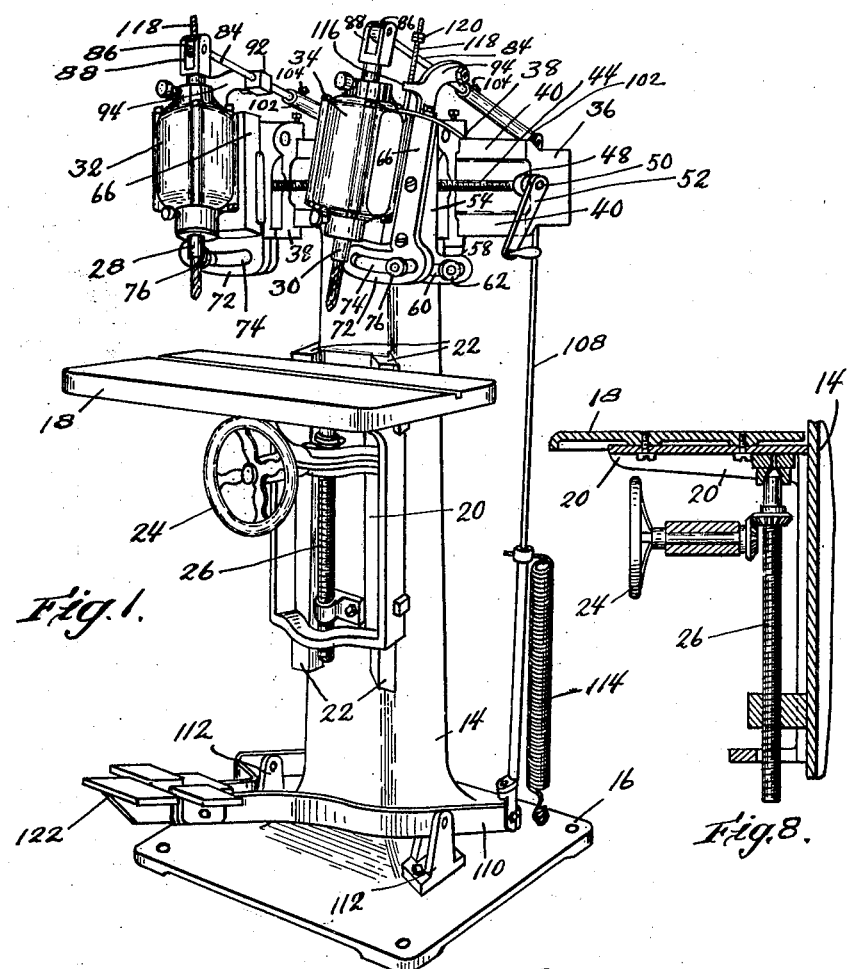
Fig. 1 is a perspective view of the boring machine embodying the invention.
Figure 7:
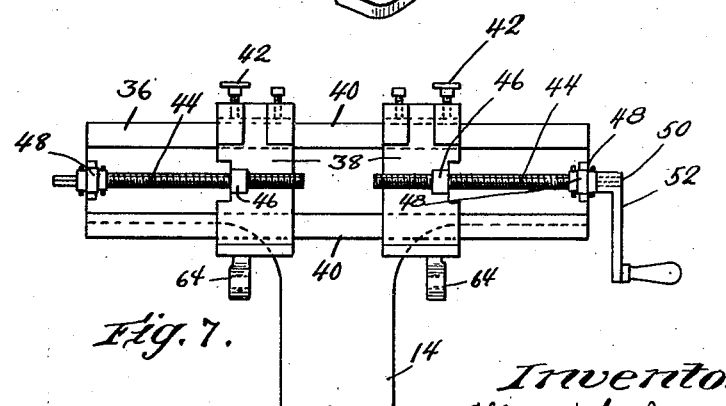
Fig. 7 is a front elevation in detail of the pedestal and illustrating more particularly the manner of mounting the motor carriage on the cross beam.
Figure 2:
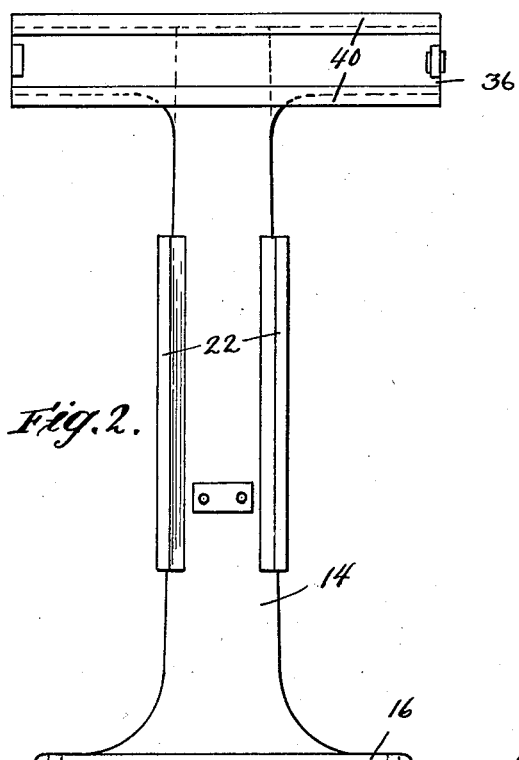
Figs. 2 and 3 are front and side elevations respectively of the pedestal which supports the mechanism.
Figure 3:
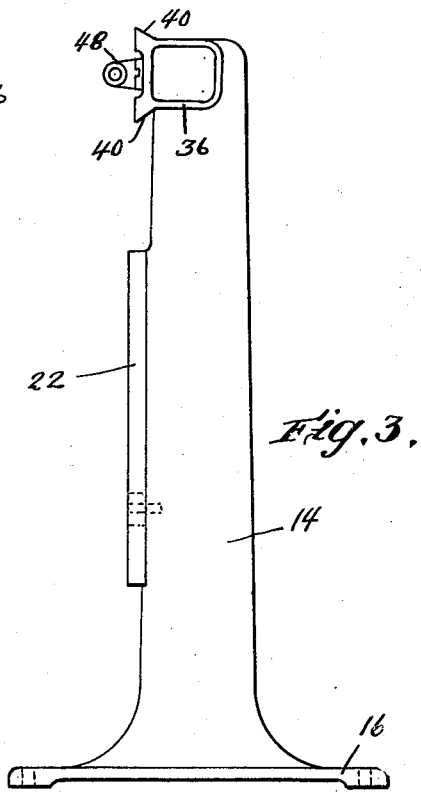
Figure 4:
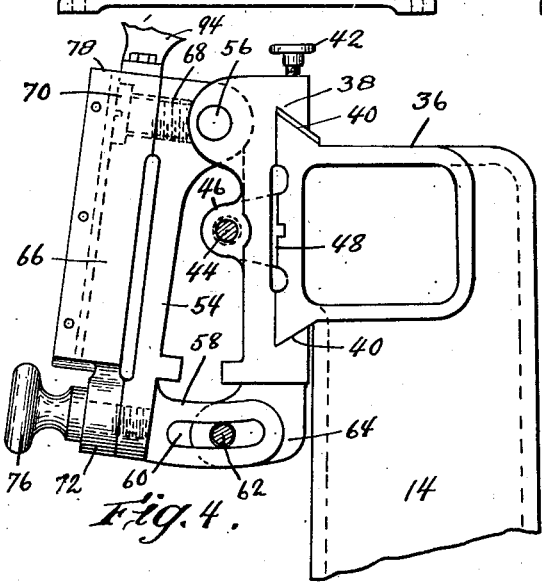
Fig. 4 is a detailed side elevation of the angularly adjustable motor supports.
Figure 5:
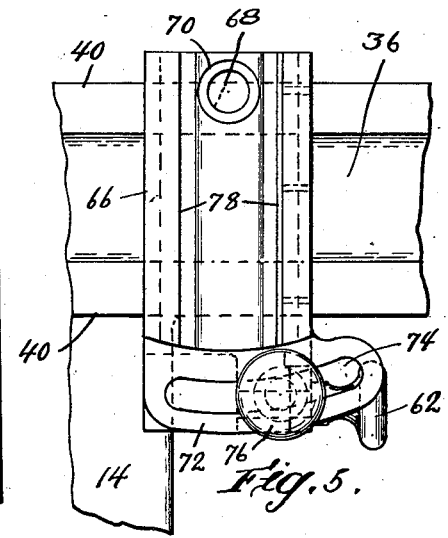
Fig. 5 is a plan view of Fig. 4.

The boring machine embodying the invention includes a relatively massive pedestal 14 which supports the component parts of the machine. The pedestal is terminated at its lower end in an enlarged base 16 upon which the pedestal is supported. A work-supporting table 18 is carried by the pedestal intermediate its height. Said table is secured to a saddle 20 which is slidably mounted for vertical adjustment on tapered ways 22, which ways are integral with the pedestal 14. Means including an adjusting wheel 24 and a screw-threaded shaft 26 are provided by which the table may be raised and lowered. The table shown is rigidly supported against any angular adjustment with respect to the vertical axis of the machine and, consequently, is unyielding against the pressure of the bits and thereby preserves the relative angles between the work and the bits.

The machine here shown is provided with two bit-driving spindles 28 and 30 whereby two holes may be bored simultaneously in the work. Means are provided, however, whereby each bit-spindle may be reciprocated independently. The bit-spindles comprise the shafts of the armatures of electric motors 32 and 34. In accordance with this invention, means are provided to reciprocate the motors whereby to advance the bits into and withdraw them from the work. The motors and associated mechanism are carried on a cross-beam 36, which cross-beam is integral with the pedestal 14 and is located horizontally at the upper end thereof and above the work table 18. Said cross-beam is cast integral with said pedestal and is of large cross-section and of massive construction whereby it is rigid and is adapted to withstand the vibration of the motors and the pressure of the work without changing its alignment with the pedestal and the work table.

Means are provided to support the electric motors on the cross-beams in such a manner that the motors can be moved horizontally along the cross-beam and above the table so that holes can be bored either simultaneously or otherwise at various distances apart. Means are also provided to support the motors in such manner that they can be set at any desired angle in two different vertical planes, thereby providing for a universal angular adjustment of the motors. The arrangement is such that the motors can be swiveled towards the right and the left and also can be swiveled forwardly and backwardly, thereby to permit holes to be sunk into the work at any desired angle within the limits of the construction. The supporting means for the motors are or may be identical and only one need be described. The supporting means includes a carriage 38 which is slidably mounted on the ways 40 of the cross-beam 36 and can be locked in any set position by the lock screw 42. The carriage can be moved along the cross-beam by means of the feed-screw 44 which is screw-threaded in a projection 46 of the carriage and is journalled in a bracket 48, which bracket is fixed to the outer end of the cross-beam. The feed screw is provided with a square end-extension 50 which is adapted detachably to receive the handle 52 by which the feed-screw may be conveniently rotated. The front and rear angle-adjusting means for the motor includes a plate 54 which is pivoted at its upper end, by suitable means, as a pin 56, to the upper end of said carriage 38. The lower end of said plate is provided with an extension 58 which is extended rearwardly at the bottom, and from one side edge, of said plate. Said extension is formed with an arcuate slot 60 therein. A clamping screw 62 is extended loosely through said slot and is screw-threaded in an ear 64 which depends from said carriage 38. Said plate 54 is adapted to be tilted about the pivot pin 56 whereby to provide for the angle-adjustment of the bit spindle forwardly and rearwardly. The plate 54 may be clamped in any angularly-adjusted position by the clamping screw 62.

The means for adjusting the motor angularly toward the right and left includes a motor carrying plate 66 which is disposed upon the front face of the plate 54. Said plate 56 is swiveled to said plate 54 at the upper end by means of a screw 68 which is threaded into the upper end of said plate 54 and is provided with an enlarged head 70 which is received within a recess in the upper end of the motor carrying plate 66. The arrangement is such that the plate 66 can swivel about said screw 68 but is secured to said plate 54 against detachment therefrom. Said motor-carrying plate is provided with an extension 72 at its lower end in which an arcuate slot 74 is formed. A clamping screw 76 is passed loosely through said slot and is screw-threaded into the lower end of said plate 54. The arrangement is such that said plate 66 can be swung about its pivot to either side of the vertical center line of the plate thereby to set the motor and its spindle 30 in any desired angular position to the right and left, within the limits of the construction, and clamped releasingly in adjusted position.

Said motor-carrying plate 66 is formed with vertically-extended and internally-tapered passages or ways 78 in its outer face. The motor carriage is provided with a base 80 formed with upwardly tapered sides 82, and is slidably received in the ways of said plate 66.

Means are provided to reciprocate the motor in any angular and horizontal adjustment of the motor, whereby to move the bit carried by the motor spindle into and out of the work supported on the table 18. Said reciprocating means includes a lever comprising a cylindrical rod 84. Said rod is provided with an eye 86 at its forward end which is disposed within a yoke 88 fixed to the upper portion of the motor frame co-axially with the motor shaft. A pin 90 is passed through said yoke and the eye 86 thereby to connect the operating rod pivotally to the motor frame. Said rod 84 is slidably received in a pivot block 92 which is journalled in a supporting bracket 94. The arrangement is such that as the motor is reciprocated the block 92 will pivot in said supporting bracket 94 and the rod will slide in said block. Said bracket 94 is provided with a foot 96 by means of which it is attached to the upper edge face of the motor carrying plate 66 and, consequently, the angular relation between the bracket and the motor is unchanged regardless of the angular setting of the motor. Said operating rod 84 is rotatably received within an end recess 100 of a rod-extension 102, and is secured therein by means of a set screw 104 which is carried by said rod-extension and is loosely received in a peripheral groove 106 of said rod. The arrangement is such that said rod and said rod extension may rotate relatively to each other while maintaining an operative connection between them. Said rod is operated by means including a vertically extended link 108 which is pivotally connected at its upper end, to said rod-extension 102 and, at its lower end, to the rear end of a treadle 110, which treadle is pivotally supported in a bracket 112 attached to the base 16 of the pedestal. The weight of the motor is counter-balanced by a spring 114 which is connected to said link 108 and to the base 16. The above described mechanism provides a universal connection between the treadle and the motor by which the motor may be reciprocated in any angular and horizontal position it may occupy.

Means are provided to limit the extent of downward movement of the motor and said means includes an extension 116 of said bracket 94, which extension is disposed above the motor frame. A rod 118 is fixed to the motor frame and extends upwardly thereabove and through a hole in said extension 116. A nut 120 is adjustably screw-threaded on the upper end of rod 118 and thereby serves to vary the extent of downward movement of the motor.

Each motor is provided with an independent operating treadle 110 so that either motor may be reciprocated independently of the other. Means including a loose treadle plate 122 is provided whereby to connect the two treadles together in a more or less common manner whereby both may be reciprocated at the same time.

The structure may be otherwise modified without departing from the spirit of the invention.

I claim:

1. A boring machine having the combination of a supporting pedestal provided with a horizontal cross-beam at the upper end thereof, a work-supporting table located below and in front of said cross-beam having a vertically-adjustable supporting-connection with said pedestal, a carriage having a sliding connection with and horizontally movable on said cross-beam, a screw-shaft carried horizontally by said cross-beam and having a screw-threaded connection with said carriage by which to move it horizontally, a swinging plate overlying the front face of said carriage and having a horizontally-pivoting connection therewith at its upper end and being free to swing about said connection toward and away from said carriage, means located at the lower end of said plate arranged to clamp said end to said carriage in any angular adjustment of said plate, a motor-supporting plate overlying said swinging plate, means horizontally-pivotally connecting the upper ends of said two plates at right angles to the pivotal connection of said swinging plate, whereby said motor-supporting plate can swing laterally over and in parallel relation with said swinging plate, means located at the lower end of said motor-supporting plate arranged to clamp it in any lateral position thereof to the lower end of said swinging plate, the outer face of said motor-supporting plate having a vertical guideway therein, an electric motor having a vertical slide located in said guideway with the motor shaft vertical, the motor shaft having a bit-receiving lower end, and means to reciprocate said motor in said guideway in any setting of said motor-supporting and swinging plates and carriage.

2. A boring machine having the combination of a supporting pedestal provided with a horizontal cross-beam at the upper end thereof, a work-supporting table located below and in front of said cross-beam having a vertically-adjustable supporting-connection with said pedestal, a carriage having a sliding connection with and horizontally movable on said cross-beam, a screw shaft carried horizontally by said cross-beam and having a screw-threaded connection with said carriage by which to move it horizontally, a swinging plate overlying the front face of said carriage and having a horizontally-pivoting connection therewith at its upper end and being free to swing about said connection toward and away from said carriage, means located at the lower end of said plate arranged to clamp said end to said carriage in any angular adjustment of said plate, a motor-supporting plate overlying said swinging plate, means horizontally-pivotally connecting the upper ends of said two plates at right angles to the pivotal connection of said swinging plate, whereby said motor-supporting plate can swing laterally over and in parallel relation with said swinging plate, means located at the lower end of said motor-supporting plate arranged to clamp it in any lateral position thereof to the lower end of said swinging plate, the outer face of said motor-supporting plate having a vertical guideway therein, an electric motor having a vertical slide located in said guideway with the motor shaft vertical, the motor shaft having a bit-receiving lower end, means to reciprocate said motor in said guideway in any setting of said motor-supporting and swinging plates and carriage, said means to limit the extent of reciprocatory movement of said motor including an ear carried by said motor-supporting plate disposed above and in the path of movement of said motor and arranged to be engaged by a part of said motor to limit the upper position thereof, said motor having a member which is located above said ear and is adapted to engage it and hold the motor from movement below a predetermined low position.

3. In a boring machine, the combination of a horizontally-movable carriage, a swinging plate having a horizontally-pivoting connection at its upper end with said carriage, by which said plate can swing forwardly away from said carriage, means connecting the lower end of said plate in any adjusted position thereof with said carriage, a motor-supporting plate having a horizontally-pivoting connection at its upper end with the upper end of said swinging plate at right angles to the pivoting connection of said swinging plate, said motor-supporting plate having a vertical guideway, a motor having a slide received in said guideway and having its bit-receiving spindle vertically arranged, and means for reciprocating said motor in said guideway including a reciprocatory lever having a pivotal connection with said motor and a fulcrum-support on said motor-supporting plate.

4. A boring machine having, in combination, a stationary table, a stationary horizontal cross-beam, a plate slidable lengthwise on said beam, a screw carried by said beam having a connection with said plate for moving it in the aforesaid manner, an intermediate plate having a pivotal connection with said sliding plate, an outer plate having a pivotal connection with said intermediate plate at right angles to said aforesaid pivoted connection, whereby said intermediate and outer plates are angularly adjustable in different planes, said plates having locking connections, one plate with another, for holding said plates releasably in any adjustment thereof, a carriage slidable in guideways in and angularly adjustable with said outer plate, an electric motor and a bit spindle driven by said motor carried by and movable with said carriage, and means supported by said outer plate arranged to reciprocate said carriage and said motor and bit spindle in any angular position of said carriage.

In testimony whereof, I have signed my name to this specification.

ELLIOTT JOHN McKNIGHT.